Dec. 15, 1925.

H. F. WEAVER 1,565,694

COTTON CHOPPER

Filed April 23, 1924   3 Sheets-Sheet 2

H. F. Weaver, Inventor

By C. A. Snow & Co.
Attorneys

Dec. 15, 1925.  H. F. WEAVER  1,565,694
COTTON CHOPPER
Filed April 23, 1924   3 Sheets-Sheet 3
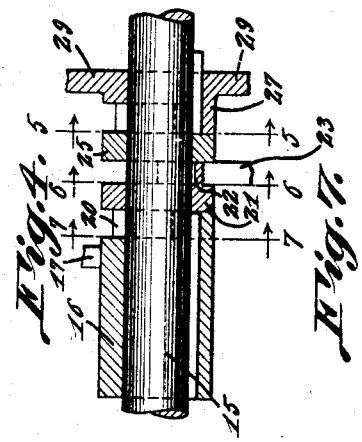
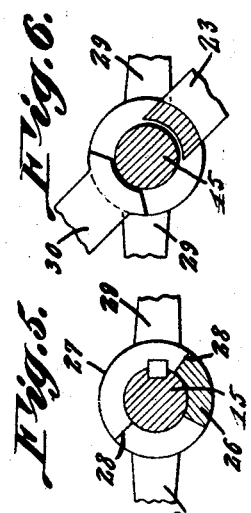
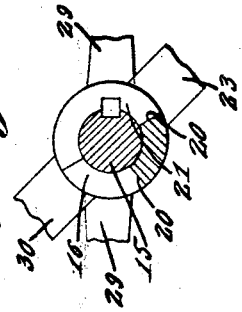
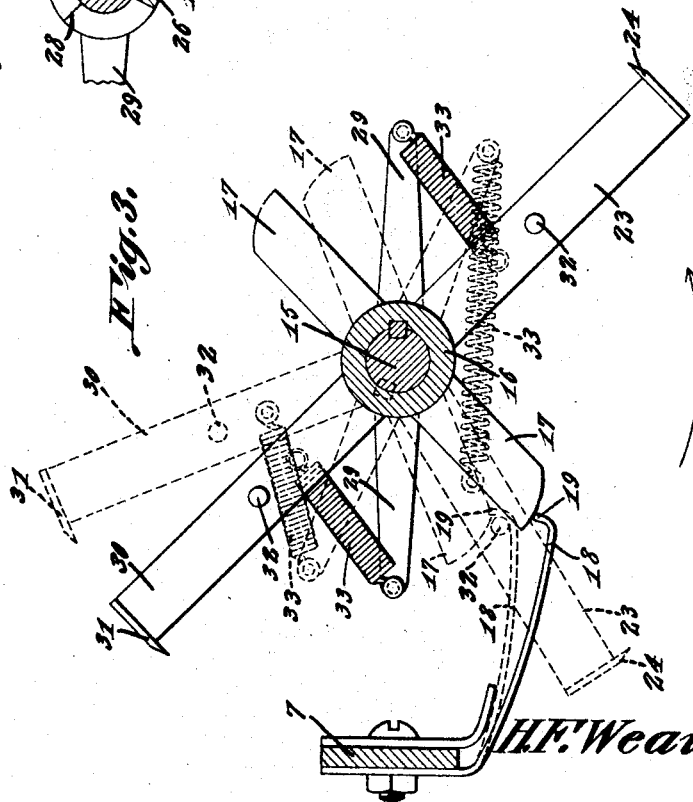
H. F. Weaver, Inventor
By C. A. Snow & Co.
Attorneys Patented Dec. 15, 1925.

1,565,694

UNITED STATES PATENT OFFICE.

HENRY F. WEAVER, OF EZRA, ILLINOIS.

COTTON CHOPPER.

Application filed April 23, 1924. Serial No. 708,471.

*To all whom it may concern:*

Be it known that I, HENRY F. WEAVER, a citizen of the United States, residing at Ezra, in the county of Franklin and State of Illinois, have invented a new and useful Cotton Chopper, of which the following is a specification.

This invention relates to a machine designed primarily for chopping cotton, one of the objects of the invention being to provide novel means whereby an abrupt chopping action of the hoe is set up so that the same will properly cut through the soil and chop out the plants in the path thereof, thus producing more efficient results than where the chopping elements are forced gradually through the parts with which they are brought into contact.

A further object is to provide means whereby the chopping action is permitted to take place only at regular intervals.

A still further object is to provide chopping mechanism which will not disturb the plants that are left standing.

A further object is to provide simple and efficient means whereby the machine can be guided readily and whereby the chopping element can be raised or lowered relative to the surface of the ground.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings—

Fig. 3 is an enlarged section on line 3—3 Fig. 2, different positions of the movable parts being indicated by full and broken lines.

Fig. 4 is a longitudinal section through the hub portion of the chopping mechanism.

Fig. 5 is a section on line 5—5, Fig. 4.

Fig. 6 is a section on line 6—6, Fig. 4.

Fig. 7 is a section on line 7—7, Fig. 4.

Fig. 8 is a section on line 8—8, Fig. 1.

Fig. 9 is a longitudinal section through the clutch mechanism.

Figure 2:
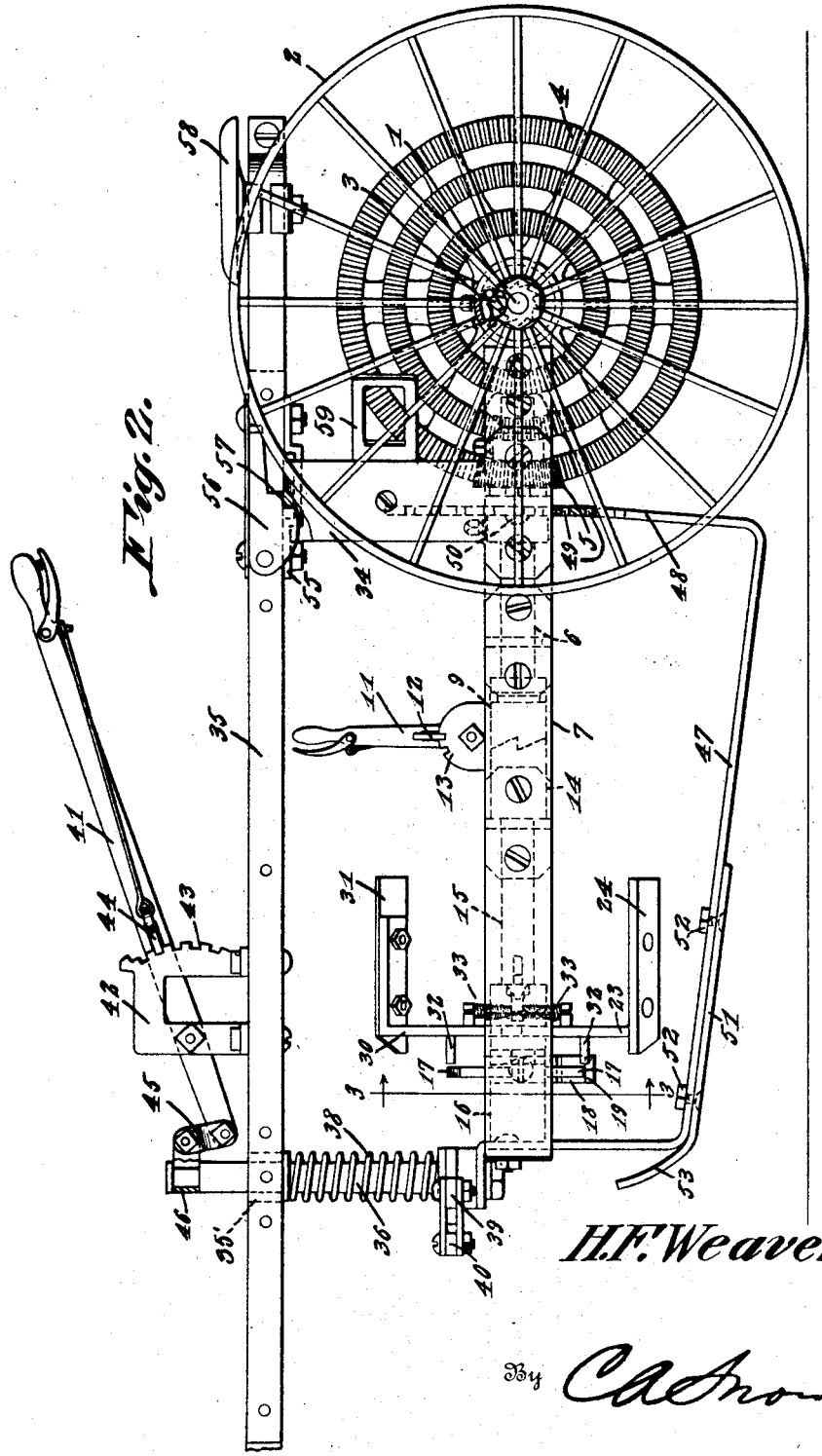
Fig. 2 is a side elevation thereof, parts being broken away.

Referring to the figures by characters of reference 1 designates the axle of the machine supported by wheels 2, there being ball and ratchet mechanism indicated generally at 3 in Fig. 2 whereby when the machine is moved forwardly the axle will rotate with the wheels but when the machine is moved rearwardly, the wheels will rotate relative to the axle. Secured to the axle is a multiple gear 4 adapted to drive a smaller gear 5. This latter gear is secured to a longitudinal shaft 6 supported centrally within a frame 7. The axle is journaled in the rear portion of this frame and at suitable intermediate points there are provided cross members 8 for bracing the frame and providing bearings for the shaft 6. Obviously by placing the gear 5 in mesh with the multiple gear 4 at different distances from the axle 1, the speed of rotation of gear 5 and its shaft 6 can be regulated. Shaft 6 does not extend throughout the length of the frame 7 but terminates adjacent the center thereof where it is provided with a clutch member 9 feathered thereon. A slide 10 engages the clutch member 9 and is guided within two of the cross members 8, this slide being shiftable by a hand lever 11 adapted to be held in either of two positions or in any suitable manner, as by means of the dog 12 and the toothed segment 13. Another clutch member 14 is secured to another shaft 15 alined with shaft 6 and journaled in the front end of the frame 7.

Secured to shaft 15 so as to rotate therewith is a hub 16 having oppositely extending tripping arms 17. These arms are adapted successively to engage and depress a resilient arm 18 extending inwardly from one side of the frame 7 and having an upturned retaining finger 19. Hub 16 has one end portion cut away annularly to provide abutments 20. An arcuate wing 21 is adapted to work against this end of the hub 16 and extends laterally from a hub 22 mounted to rotate freely on the shaft 15. This hub 22 has an arm 23 extending radially therefrom and provided at its outer end with a cutting blade 24 extending laterally therefrom. Another hub 25 is mounted to rotate freely on the shaft 15 and has a laterally extending arcuate wing 26 which projects into the cut away end of a hub 27 fixedly attached to the shaft 15. This cut away hub 27 provides abutments 28 for limiting the movement of the arcuate wing 26 relative to the hub 27. Oppositely extending arms 29 are carried by the hub 27 and an arm 30 is carried by the hub 25. This latter arm 30 has a laterally extending chopping blade 31. A pin 32 extends laterally from each of the arms 23 and 30 and these pins are so located and proportioned that during the rotation of the arms 23 and 30 about the axis of the shaft 15 the pins 32 will be brought successively into engagement with the spring 18 and against this retaining finger 19 as shown by broken lines in Fig. 3. The arms 29 of the hub 27 are connected by coiled springs 33 to the respective arms 23 and 30, these springs serving to hold the advancing edges of the arcuate wings 21 and 26 pressed against the abutments in the paths thereof.

It will be understood that when the shaft 16 is rotating the tripping arms 17 and the spring carrying arms 29 rotate with the shaft. The springs 33 will also cause the arms 23 and 30 to rotate with the shaft until pin 32 of the arm 23 comes against the resilient arm 18. This will cause the arm 23 to be held back and its spring 23 to be placed under increased tension as illustrated by broken lines in Fig. 3. While the arm 23 is thus being held, the arm 30 has been moved to the position shown by broken lines in Fig. 3 and one of the tripping arms 17 at this time comes against the finger 19 and depressed it as shown by full lines in Fig. 3. Thus the finger is shifted out of engagement with the restrained pin 31 and the tensioned spring 33 will impart a swift sweeping motion to the arm 23 with the result that its cutting blade 24 will be swung quickly through an arc under shaft 15 and chop through the soil and plants in the path thereof. This action is so rapid that the remaining plants left standing will not be disturbed. Shortly after this arm 23 has thus been operated, the pin 32 on the arm 30 comes against the spring arm 18 and is restrained after which the other spring 33 becomes tensioned and the parts are thereafter released by the second tripping arms 17. Thus the operation already described is repeated.

Figure 1:
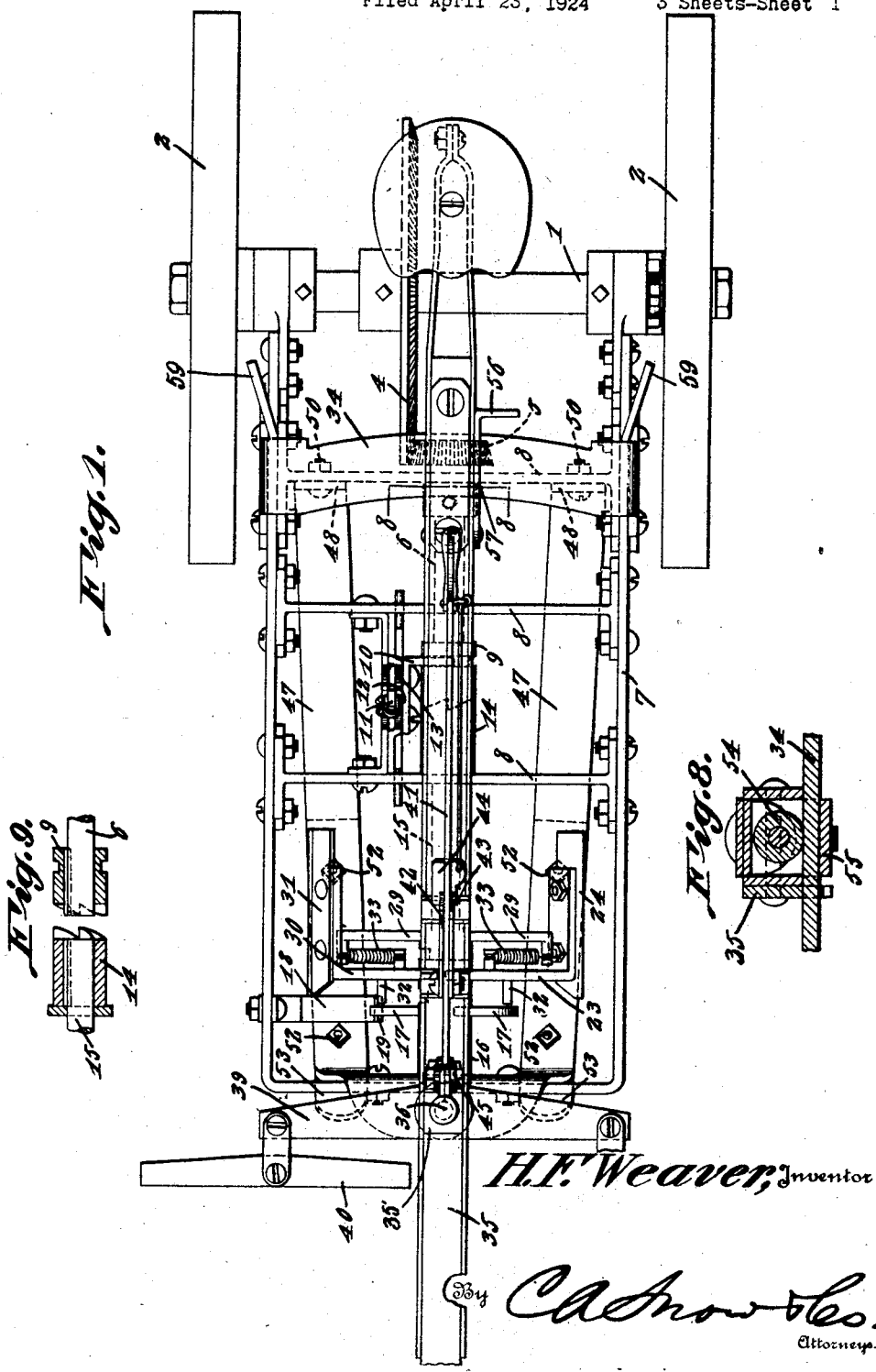
Figure 1 is a plan view of the machine.

An upstanding yoke 34 is fixedly mounted on the frame 7 near the axle 1 and serves to support the rear portion of the tongue 35. The top portion of the yoke is arcuate as shown particularly in Fig. 1 and is concentric with an upstanding post 36 carried by the front portion of the frame 7 at the center thereof. The tongue 35 has a pivoted block 35' mounted to slide and rotate on this post and is yieldingly supported by a spring 38 mounted on the post. The post also constitutes a connection for a whiffletree 39 to which are connected single trees 40. A lever 41 is fulcrumed on a bracket 42 mounted on the tongue 35. This bracket is provided with a toothed segment 43 and a dog 44 is carried by the lever and cooperates with this segment to hold the lever against movement. A link 45 is used for connecting the lever to a collar 46 engaging the upper end of the post. Obviously by manipulating this lever the post 37 can be raised or lowered relative to the tongue so as to raise or lower the frame 7 relative to the surface of the ground.

Guide runners 47 are supported longitudinally beneath the side portions of the frame and are adjustably connected at their rear ends to said frame 7 by means of tongues 8 having longitudinal series of apertures 49 therein. Any of these apertures is adapted to receive a bolt indicated at 50 whereby the tongues can be held securely against movement relative to the frame. The front ends of the runners are fixedly attached to the front end of the frame 7 and each runner may, if desired, be provided at its front end with a wear chute 51 detachably connected thereto as at 52 and provided with an upturned front end 53. That portion of the tongue 35 resting on the arcuate top of the yoke 34 contains a roller bearing 54 adapted to engage the yoke and this bearing is held in contact with the yoke by a guide strap 55 secured to the bottom of the tongue and extending under the top of the yoke. A latch 56 is pivotally connected to one side of the tongue and adapted to be seated in a notch 57 in the yoke for the purpose of holding the tongue against sliding movement relative to the yoke.

A seat for the driver has been indicated at 58 and can be adjustably mounted on the rear portion of the tongue 35.

It is believed that the operation of this mechanism will be apparent from the foregoing description. If the clutch members 9 and 14 are disengaged the machine can move forwardly without rotating the shaft 15 and, consequently, the chopping mechanism will not operate. At this time or during the chopping operation the machine can be guided by lifting the latch 56 from notch 57 and forcing the rear portion of the tongue laterally relative to the frame 7 so that the bearing 54 will travel along the arcuate top of the yoke 34. Also, during the chopping operation or at other times the machine can be raised or lowered relative to the tongue by manipulating lever 41 as heretofore explained.

When it is desired to operate the chopping mechanism, lever 11 is shifted to move slide 10 and throw the clutch member 9 into engagement with the clutch member 14. Thus the two shafts 6 and 15 will be coupled together and as the shaft 15 revolves the chopping arms will be successively retarded and released in the manner heretofore described, cutting out the plants in the paths of the chopping blades, but moving so swiftly across the row as not to disturb those plants left standing.

For the purpose of facilitating the steering of the device stirrups 59 are extended rearwardly from the sides of the yoke 34 where they can receive the feet of the driver, who, by pressing against the stirrups can properly shift the wheel supported yoke relative to the tongue.

What is claimed is:—

1. A cotton chopper including a frame rotatable shaft, arms rotatable therewith and mounted for limited independent rotation, a cutting element carried by each arm, springs for yieldingly swinging the arms in predetermined positions relative to the shaft, separate means upon the frame and cooperating with the arms for separately retarding said arms during the rotation of the shaft to increase the tension of the springs, and means rotating with the shaft for releasing the restrained arms.

2. In a cotton chopper a shaft mounted for rotation, arms carried by the shaft and having limited rotary movement relative thereto, yielding means connected to the shaft and arms for holding the arms against movement relative to the shaft, means for successively retarding the rotation of the arms with the shaft to place the yielding means under increased tension, and means operated by the shaft in timed relation to release the restrained arms for independent actuation by the yielding means.

3. In a cotton chopper, a shaft mounted for rotation, arms mounted for limited independent rotation on the shaft, yielding means attached to the arms for holding them against independent rotation, cutting elements upon the arms, restraining means attached to the frame, means on the arms for successive engagement with the restraining means to hold back the rotation of the arms with the shaft and to place the yielding means under increased tension, and means carried by the shaft for shifting the restraining means to release the held arms.

4. In a cotton chopper the combination with a rotatable shaft, of arms mounted for limited independent rotation upon the shaft, cutting elements carried by the arms, springs attached to the arms for holding them yieldingly against independent rotation, resilient restraining means extending close to the path of the arms, means on the arms for engagement with the restraining means for holding the arms successively against rotation with the shaft and to place the springs under increased tension, and means rotatable with the shaft for shifting the restraining means to release the held arm for actuation by its tensioned spring.

In testimony that I claim the foregoing as my own, I have hereto affixed my signature.

HENRY F. WEAVER.